United States Patent [19]

Arnold

[11] Patent Number: 4,458,384
[45] Date of Patent: Jul. 10, 1984

[54] HOLDER FOR EYEGLASSES

[76] Inventor: Theresa R. Arnold, 748 Junipero Serra, San Francisco, Calif. 94127

[21] Appl. No.: 448,447

[22] Filed: Dec. 10, 1982

Related U.S. Application Data

[63] Continuation of Ser. No. 223,600, Jan. 9, 1981, abandoned.

[51] Int. Cl.³ .............................................. A44B 21/00
[52] U.S. Cl. ....................................... 24/3 C; 24/3 D; 24/3 J; 24/13; 206/5; 224/251; 224/252
[58] Field of Search ..................... 206/5; 24/3 C, 3 D, 24/3 E, 3 F, 3 G, 3 J, 10 R, 11 F, 12, 13; 224/248, 251, 252, 255

[56] References Cited

U.S. PATENT DOCUMENTS

| | | | |
|---|---|---|---|
| 160,432 | 3/1875 | Holabird et al. | 224/251 X |
| 177,415 | 5/1876 | Miser | 24/3 G |
| 439,423 | 10/1890 | Potts | 24/12 |
| 721,881 | 3/1903 | Ford | 24/13 |
| 960,092 | 5/1910 | Hunter | 24/11 F |
| 1,322,966 | 11/1919 | Sinclair | 24/10 X |
| 1,328,644 | 1/1920 | Bradley et al. | 24/3 G |
| 1,344,821 | 6/1920 | Rhodes | 24/13 |
| 2,102,218 | 12/1937 | Rakauskas | 24/3 G |
| 2,425,561 | 8/1947 | Quidas | 24/10 R X |
| 2,570,670 | 10/1951 | Harold | 24/11 C |
| 2,670,886 | 3/1954 | Walton | 24/3 E X |
| 3,148,812 | 9/1964 | Hilsinger | 24/3 E |
| 3,508,691 | 4/1970 | Langbehn | 224/252 X |

FOREIGN PATENT DOCUMENTS

| | | | |
|---|---|---|---|
| 788663 | 7/1968 | Canada | 24/3 J |
| 611734 | 6/1935 | Fed. Rep. of Germany | 24/11 C |
| 2100677 | 7/1972 | Fed. Rep. of Germany | 24/13 |
| 2728906 | 1/1979 | Fed. Rep. of Germany | 206/5 |

Primary Examiner—Allan N. Shoap
Attorney, Agent, or Firm—John L. McGannon

[57] ABSTRACT

A holder adapted to be removably attached to a garment, such as a shirt or blouse, for releaseably holding a pair of eyeglasses on the garment. The holder includes a body formed by a pair of end parts which effectively form closed loops, and a central part which interconnects the end parts. An attachment device, such as a pin, is carried by the central part for attachment to a garment. The central part can either be vertical, horizontal or inclined when the body is attached to the garment, and the end parts are adapted to receive and removably hold one of the two temples of a pair of eyeglasses while the other temple extends longitudinally of the first temple but externally of the end parts. Several embodiments of the invention are disclosed.

1 Claim, 13 Drawing Figures

U.S. Patent      Jul. 10, 1984      4,458,384
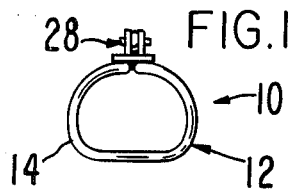
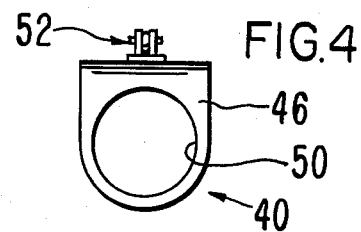
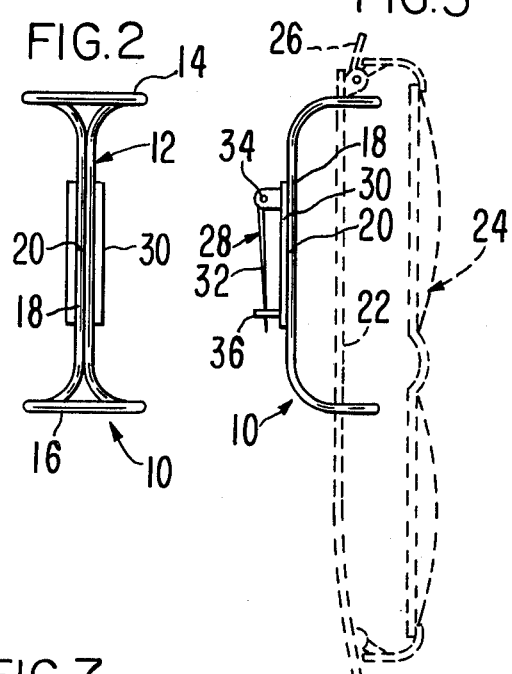
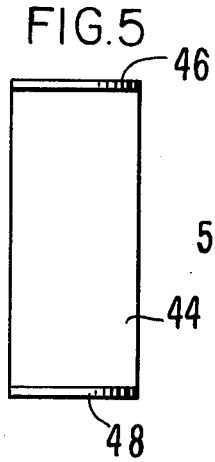
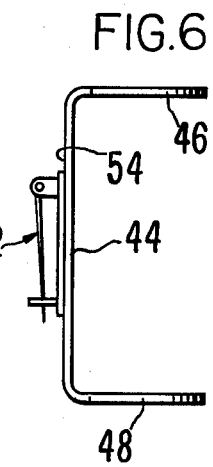
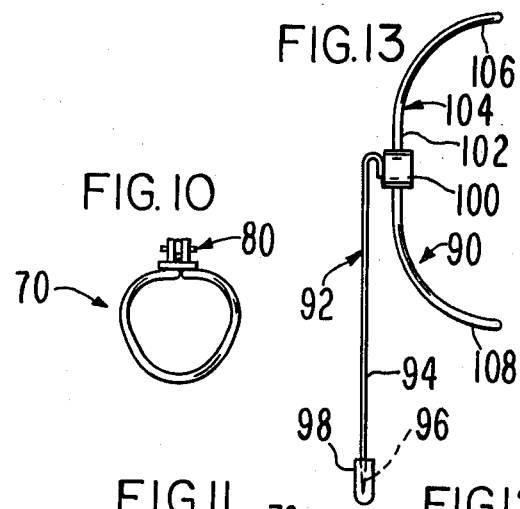
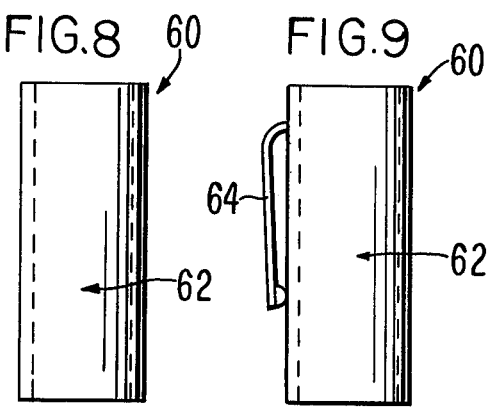
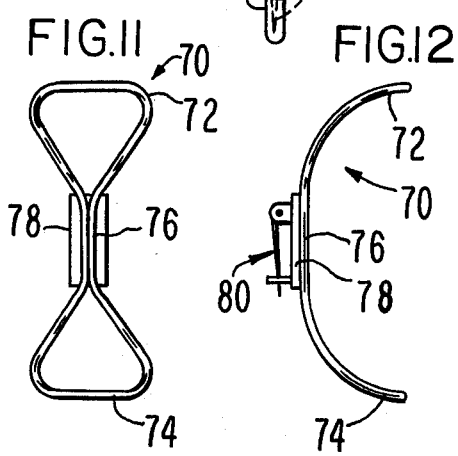

HOLDER FOR EYEGLASSES

This is a continuation of application Ser. No. 223,600 filed Jan. 9, 1981, now abandoned.

This invention relates to improvements in the holding of eyeglasses when the eyeglasses are not to be worn in front of the eyes and, more particularly, to an eyeglass holder for removable attachment to a garment, such as a shirt or blouse.

BACKGROUND OF THE INVENTION

It is oftentimes desirable to have a simple and easy way of holding a pair of eyeglasses on the person when the eyeglasses are not to be worn in front of the eyes. Eyeglasses could be put in a conventional carrying case but the case would have to be put into a pocket or held in the hand, an inconvenience for many people. Also, the ends of the temples of a pair of eyeglasses could be provided with a chain or cord which loops around the neck with the eyeglasses hanging down in the front of the person. However, many people object to holding the eyeglasses in this way because the eyeglasses tend to swing and strike objects in front of the person, sometimes causing damage to the eyeglasses themselves.

Prior disclosures relating to this field of holders for eyeglasses include the following U.S. Pat. Nos. 2,097,371; 2,511,105; 2,850,152; 3,819,095; 3,917,135; 4,055,873.

In view of the drawbacks of the holders mentioned above a need has arisen for an improved holder which is simple and rugged in construction, is inexpensive to produce and can be quickly and easily attached to and separated from a garment yet the holder allows a pair of eyeglasses to be positively held without any attachment to or enclosure of the eyeglasses.

SUMMARY OF THE INVENTION

The present invention satisfies the aforesaid need by providing an improved holder for a pair of eyeglasses in which a pair of spaced, tubular end parts in the form of closed loops are interconnected by a central part and then attached to a garment by an attachment device secured to the central part. Thus a temple of a pair of eyeglasses can be inserted into and extend through the end parts and removably retained on the garment yet the eyeglasses are accessible to the user at all times and the eyeglasses are held in a positive manner without the need for a conventional holder.

The primary object of this invention is to provide an improved holder for a pair of eyeglasses wherein the holder includes a body having a pair of end parts in the form of closed loops which are interconnected by a central part provided with an attachment device thereon so that the end parts can receive a temple of a pair of eyeglasses and the holder can be attached to a garment to allow the eyeglasses to be held yet accessible at all times while the holder is worn on the garment.

Other objects of this invention will become apparent as the following specification progresses, reference being had to the accompanying drawing for an illustration of several embodiments of the invention.

IN THE DRAWINGS

FIG. 1 is a top plan view of a first embodiment of the eyeglass holder of the present invention;

FIG. 2 is a front elevational view of the holder of FIG. 1;

FIG. 3 is a view of the holder of FIGS. 1 and 2 showing the holder rotated 90° from the position of FIG. 2, and further showing how the holder receives and holds a temple of a pair of eyeglasses in place;

FIGS. 4–6 are views similar to FIGS. 1–3 but showing a second embodiment of the holder of the present invention;

FIGS. 7–9 are views similar to FIGS. 4–6 but showing a third embodiment of the holder;

FIGS. 10–12 are views similar to FIGS. 7–9 but showing a fourth embodiment of the holder of the invention; and FIG. 13 is a view similar to FIG. 12 but showing a fifth embodiment of the present invention.

A first embodiment of the eyeglass holder of the present invention is broadly denoted by the numeral 10 and includes a body 12 formed of a single length of wire or similar material. Body 12 is shaped to present a pair of closed end parts or loops 14 and 16 and a central part or post 18 interconnecting loops 14 and 16 at the aligned sides thereof as shown in FIGS. 1 and 3. Loops 14 and 16 are formed by causing the wirelike material to follow a generally curved path and post 18 is formed by causing the wirelike material to follow a generally rectilinear path. The ends of the wirelike material are near a junction 20 (FIGS. 2 and 3). The wirelike material can be shaped by any suitable forming process.

When finally shaped, holder 10 has loops 14 and 16 in alignment with each other so that they can receive a temple 22 (FIG. 3) of a pair of eyeglasses 24 when the other temple 26 of the eyeglasses extends generally parallel with temple 22 and outside of loops 14 and 16. The transverse dimensions of loops 14 and 16 are large enough to accommodate even a relatively wide temple 22 and a spacing between loops 14 and 16 is great enough so that the eyeglasses 24 will not rock with any appreciable degree and will therefore be essentially captured in the loops. As shown in FIG. 3, this spacing between loops 14 and 16 is preferably at least one half the length of temple 22. This assures only a minimum of movement of the eyeglasses relative to holder 10 and provides assurance to the user that the eyeglasses will be protected while being held by the holder.

Holder 10 is to be releaseably connected to a garment, such as a shirt or blouse. To this end, holder 10 has a conventional attachment device 28 secured to post 18 in any suitable, such as by spot welding. Attachment 28, for purposes of illustration includes a base 30, a pin 32, a pivot 34 for one end of a pin 32, and a hook 36 for receiving the free, opposite end of the pin.

In use, holder 10 is releaseably connected to a garment by having pin 32 pierce the garment and then emerge from the garment and to be hooked under hook member 36. When used, holder 10 can be arranged so that the longitudinal axis of post 18 is either vertical, horizontal or inclined. A preferred way of using holder 10 is to mount post 18 in a vertical position so that loops 14 and 16 are vertically aligned with each other. A temple 22 can then be quickly and easily inserted into the aligned loops 14 and 16 and the eyeglasses arranged in the manner shown in FIG. 3 so that the eyeglasses will be not only held by the holder but will be substantially protected by being in proximity to the garment. Moreover, the positions of the loops effectively spaces the eyeglasses from the shirt or blouse to prevent any damage to the shirt or blouse or to the eyeglasses.

A second embodiment of the holder of the present invention is shown in FIGS. 4–6 and is denoted by the numeral 40. Holder 40 is formed from a single, rigid body 42 which typically is a rectangular member formed of metal or plastic. Body 42 has a flat central part 44 and a pair of end parts or loops 46 and 48. Each of the end parts has a hole 50 therethrough, holes 50 of parts 46 and 48 being aligned with each other and adapted to receive a temple of a pair of eyeglasses, such as temple 22 of eyeglasses 24. Holes 50 are shown as being circular but they could be of other shapes if desired.

An attachment device 52 is carried by the flat face 54 of central part 44. Device 52 is substantially the same in construction as attachment device 28.

Holder 40 is used in the same manner as that described above with respect to holder 10. Holder 40 can be used with central part 44 extending vertically, horizontally or inclined. Preferably, central part 44 extends vertically in use so that end parts 46 and 48 are vertically spaced from each other.

A third embodiment of the holder of the present invention is broadly denoted by the numeral 60 and is shown in FIGS. 7-9. Holder 60 includes a tubular body 62 having a pair of open ends and a generally circular cross section as shown in FIG. 7. The end parts of body 62 define closed loops for the same purpose as the loops described above with respect to holders 10 and 40. A spring clip 64 is carried on the side of body 62 and operates in the same manner as a spring clip on the cap of a fountain pen or a mechanical pencil.

Body 62 is adapted to receive a temple of a pair of eyeglasses, such as temple 22 of eyeglasses 24. The temple is inserted in one end of body 62 and extends outwardly from the opposite end thereof. The length of body 62 is such that it effectively captures the temple and prevents any substantial movement of the temple within body 62. Typically, holder 60 is usable on shirts and blouses having breast pockets so that clip 64 can be placed over the front panel of the pocket with body 62 externally of the pocket. In this way, the eyeglasses will be also externally of the pocket. However, if the pocket is deep enough, body 62 can be internally of the pocket as can the eyeglasses themselves.

Body 62 can be made of any suitable material, such as plastic or metal. Also, clip 64 can be secured to the outer surface of body 62 in any suitable manner.

A fourth embodiment of the holder of the present invention is shown in FIGS. 10-12 and is denoted by the numeral 70. Holder 70 is similar in construction to holder 10 in that both of the holders are formed from a single length of rigid wirelike material which is shaped to form a pair of end aligned loops interconnected by a central post 76. Each end loop includes a single rigid wire segment having a pair of opposed ends rigidly secured or integral with a central post 76 secured to a planar base 78. Each rigid wire segment is shaped to present a pair of spaced, generally non-yieldable wire sides 71 and 73 and a wire crosspiece 75 integral with the outer ends of the wire sides 71 and 73. Wire sides 71 and 73 are curved out of the plane of base 78 as shown in FIG. 12 and they diverge relative to each other as their outer ends are approached to form with wire crosspiece 75 the corresponding end loop. The holder 70 differs from holder 10 in that the junctions between the loops and the central post are curved as shown in FIG. 12. Thus, holder 70, which has loops 72 and 74, has a construction in which the rear ends of loops 72 and 74 meet with the central post 76 near the ends of a base 78 of an attachment device 80 which is substantially similar in all respects, except for size, with attachment device 28. Nonetheless, the shape of the holder body provides a more aesthetic design for the holder than does the holder body of holdeer 10, and holder 70 may, therefore, be more preferred than holder 10 to many users. Loops 72 and 74 are spaced apart by a distance sufficient to receive a major portion of the temple of a pair of eyeglasses. Typically, the spacing between loops 72 and 74 will be at least one half the length of the temple which extends through the loops. Holder 70 is used in the same manner as holders 10 and 40.

FIG. 13 shows a fifth embodiment of the holder of the present invention, the holder being denoted by the numeral 90. Holder 90 is substantially the same in construction as holder 70 except that holder 90 has a different attachment device 92 which is in the form of an elongated pin 94 having a pointed end 96 which is removably covered by a cap 98. The opposite end of the pin is secured to a base 100 affixed to the central post 102 of holder body 104, the holder having a pair of spaced loops 106 and 108. Holder 90 is used in substantially the same manner as holder 70 except that pin 94 is used for attachment to a garment rather than attachment device 80 as in the case of holder 70.

I claim:

1. A holder for a pair of eyeglasses having a pair of temples comprising: a body having a pair of spaced end parts and a planar central part interconnecting the end parts, each end part part including a single, rigid, substantially non-yieldable wire segment having a pair of opposed ends rigidly secured to the central part and shaped to present a pair of wire sides and a wire crosspiece integral with the outer ends of the wire sides, said wire sides being curved out of the plane of the central part and diverging relative to each other as their outer ends are approached, the wire sides, the wire crosspiece of each wire segment and the central part defining axially opposed closed loops, the closed loops being aligned with each other and being too small to receive a pair of eyeglasses, but said wire sides being curved out sufficiently so that said loops are large enough for loosely receiving in a gripless manner a temple of a pair of eyeglasses, whereby the temple, when received in said closed loops, extends longitudinally of the central part and is releasably held by the end parts; and means on the central part for attaching the body to a garment.

* * * * *